United States Patent [19]

Rothrock et al.

[11] 3,719,562

[45] March 6, 1973

[54] PRODUCTION OF POLYNUCLEOTIDE PHOSPHORYLASE

[75] Inventors: John W. Rothrock, Watchung; Stuart R. Michelson, Englishtown, both of N.J.

[73] Assignee: Merek & Co., Inc., Rahway, N.J.

[22] Filed: Oct. 1, 1970

[21] Appl. No.: 77,334

[52] U.S. Cl. ................................................. 195/66 R
[51] Int. Cl. .............................................. C07g 7/28
[58] Field of Search ..................................... 195/66 R

[56] References Cited

OTHER PUBLICATIONS

Littauer et al., Journal of Biological Chemistry, Vol. 226, pages 1077–1092, (1957).

*Primary Examiner*—Lionel M. Shapiro
*Attorney*—Henry H. Bassford, Jr., I. Louis Wolk and J. Jerome Behan

[57] ABSTRACT

Polynucleotide phosphorylase is prepared by a novel process which comprises separating the cell paste from a *Micrococcus lysodeikticus* fermented broth, and rupturing this cell paste utilizing a homogenizer; substantially saturating the homogenized, ruptured cell slurry with ammonium sulfate, thereby precipitating unwanted by-products, and separating the latter from the supernatant liquid containing the desired enzyme product; dialyzing this supernatant solution against a Tris chloride-magnesium acetate buffer, thereby removing inorganic salts; adding sufficient cold ethanol to the retentate to bring the ethanol concentration to approximately 40 percent, thereby precipitating enzyme product; and separating said enzyme product, the polynucleotide phosphorylase, from the resulting mixture. The polynucleotide phosphorylase is utilized in the enzymatic polymerization of nucleoside diphosphates, such as cytidine diphosphate and inosine diphosphate, to the corresponding polynucleotides, polyribocytidylic acid and polyriboinosinic acid.

5 Claims, No Drawings

PRODUCTION OF POLYNUCLEOTIDE PHOSPHORYLASE

This invention is concerned generally with a novel process for preparing the enzymatic catalyst, polynucleotide phosphorylase (PNPase), substantially free from inhibitory factors and unwanted protein material. More particularly, it relates to an improved procedure whereby PNPase is separated from an aqueous solution, which comprises adding to such solution a water-miscible organic solvent, characterized as being substantially a non-solvent for PNPase, whereby the PNPase precipitates and is recovered in solid form; the PNPase is then ordinarily redissolved in a buffer solution and subjected to dialysis thereby separating unwanted inorganic salt impurities.

In carrying out this novel process, an aqueous PNPase solution is ordinarily obtained by fermenting an aqueous nutrient medium with Micrococcus lysodeikticus (now called *M. luteus*) organisms, separating the cell paste containing the PNPase enzyme, subjecting this cell paste to the action of a homogenizer, thereby rupturing the cells, and separating the cells from the supernatant aqueous PNPase solution. Alternatively, the cells are lysed, preferably by bringing together in aqueous medium the cells and lysozyme, at a cell concentration of about 100 gms. per liter, and a lysozyme concentration of about $3.5 \times 10^6$ units per liter. The aqueous PNPase solution (either supernatant from centrifugation of homogenized cells, or lysate) is conveniently stored, if desired, in the frozen state.

To this aqueous PNPase solution which, if stored for any length of time in the frozen state, may conveniently be centrifuged to remove separated protein material, is added sufficient ammonium sulfate to bring the ammonium sulfate concentration of the solution to about 24 percent, thereby precipitating protein material (as well as cell debris when the cells are lysed). The resulting supernatant PNPase solution, which may be subjected to dialysis, if desired (thereby removing ammonium sulfate), is then diluted with a water-miscible organic solvent such as acetone or preferably a lower alkanol, such as methanol, ethanol, isopropanol and the like, whereupon the major portion of the PNPase separates from the aqueous organic solvent solution. For achieving a maximal separation of PNPase, the optimal concentration of organic solvent in the resulting aqueous mixture is, for methanol, approximately 30–80 percent, with about 50 percent being preferred; for isopropanol approximately 30–40 percent; and for ethanol approximately 35–45 percent, with about 40 percent ethanol concentration being preferred. It is ordinarily advantageous to adjust the pH of the aqueous PNPase solution to about 8.0 and to utilize BBA alcohol at a concentration of 40 percent. The slurry, which results from mixing the organic solvent with aqueous PNPase solution, is centrifuged thereby separating precipitated PNPase. This PNPase is then ordinarily dissolved in pH 8.2 buffer solution, and the solution subjected to dialysis against fresh buffer, thereby removing residual ammonium sulfate. The resulting buffered PNPase solution is clarified by centrifugation and is conveniently stored in the frozen state. This PNPase solution is relatively free of inhibitory factors and ordinarily possesses a specific PNPase activity of about 0.04 to about 0.10 units per mg. protein.

The following examples illustrate methods of carrying out the present invention, but it is to be understood that these examples are given for purposes of illustration and not of limitation.

EXAMPLE 1

A fermentation medium is prepared containing the following:

| | |
|---|---|
| Difco yeast extract | 4670.0 g. |
| $MgSO_4.7H_2O$ | 186.8 g. |
| NaCl | 9.3 g. |
| $FeSO_4.7H_2O$ | 9.3 g. |
| $MnSO_4.4H_2O$ | 7.4 g. |
| $NaHCO_3$ | 3969.6 g. |
| Dextrose | 9340.0 g. |
| Water to make up a volume of 467 liters (125 gals.) | |

The above medium is sterilized and inoculated with a 1.5 liters of a culture of *Micrococcus lysodeikticus* (now called *M. luteus*; ATTC No. 4698) which has been grown in 1.5 liters of the same medium for about 36 hours at 28°C. The inoculated broth is then incubated with agitation and aeration, at a temperature of about 28°C. for a period of approximately 20 hours, at the end of which time the optical density (O.D.) of the fermented broth is approximately 2.0. The fermented broth is cooled rapidly to about 0°–5°C., and is then subjected to centrifugation, while maintaining the temperature below about 5°C., preferably using a 4½-inch Sharples centrifuge, at a through-put of about one gallon per minute. The supernatant is discarded, and the cold cell paste, weighing about 1.5–2.5 kg., is resuspended in ice cold 0.5 percent sodium chloride solution, using about one liter of sodium chloride solution for each kilogram of cell paste. The temperature of the resulting slurry is maintained at about 0–5° C., 1 ml. of 2-mercapto-ethanol antioxidant is added with stirring, and the slurry is strained through gauze, thereby removing unbroken lumps which are reworked and returned to the slurry.

The resulting suspension (which is precooled to about 0–5°C. before each pass) is then passed three times through a homogenizer at approximately 8000 p.s.i.g., thereby rupturing the cells. This homogenization is conveniently carried out using the Laboratory Homogenizer, Model 15M50–8TBA, manufactured by the Manton-Gaulin Mfg. Co., Everett, Mass. The homogenized slurry is then centrifuged for 40 minutes at 11,000 times G in a Sorvall refrigerated centrifuge; the residual solid material, namely cell debris, is discarded, and the clear supernatant (volume approximately 2000 ml.) is frozen. Assay of this supernatant shows protein content approximately 3.6 mg/ml. and PNPase activity about 0.05 units/ml; 0.014 units PNPase/mg. protein.

A portion of this frozen supernatant is thawed, and may be centrifuged if desired to remove a small amount of separated protein material. To about 130 ml. of this supernatant, containing a total of about 24 units of PNPase and cooled to 0–5°C., is added slowly, with stirring, about 31 g. of solid ammonium sulfate; the concentration of ammonium sulfate in the resulting solution is approximately 24 percent. The resulting mixture is stirred for an additional period of about 20 minutes, and then centrifuged at 23,000 times G for a period of about 30 minutes. The precipitated solids, mainly protein material, are discarded; about 4.9 units of PNPase activity are lost in this precipitate. This centrifugation operation (together with that prior to the ammonium sulfate addition, when used), while removing separated protein material, achieves a substantial increase in PNPase activity apparently due to removal of inhibitory factors.

To the supernatant from this centrifugation, approximately 140 ml. volume, is added slowly, with stirring, about 75 ml. of BBA ethanol to give a final ethanol concentration of about 35 percent, thereby precipitating PNPase. The resulting aqueous ethanolic mixture is stirred at a temperature of 0–5°C., with stirring, for a period of about 20 minutes, and the resulting mixture is centrifuged at 23,000 times G for a period of about 35 minutes, thereby recovering the precipitated PNPase material; the supernatant, containing about 3.5 units of PNPase activity is discarded.

The precipitated PNPase material is triturated in a small volume (approximately 15–20 ml.) of cold (about 5°C.) PNPase buffer having the following composition:

10 ml. 1M tris(hydroxymethyl)-amino-methane HCl solution
1 ml. of 1M magnesium acetate solution
0.07 ml. of thioethanol
Glass-distilled water to bring total volume to 1 liter, and the pH of the buffer is adjusted to 8.2.

The resulting solution is then dialyzed at a temperature of about 5°C. for a period of about 15 hours against fresh PNPase buffer. The retentate is clarified by centrifuging (preferably using a Sorvall refrigerated centrifuge) while maintaining the temperature of about 0–5° and the clear supernatant is bottled, frozen, and stored in the frozen state. Assay of this supernatant, volume 17.6 ml., shows protein content 2.8 mg/ml.; PNPase activity approximately 0.273 units/ml; 0.094 PNPase units/mg. protein. The total PNPase content of the supernatant is approximately 4.8 units which represents a 20 percent recovery of PNPase activity from supernatant obtained by centrifuging this homogenized cell suspension.

EXAMPLE 2

An *M. luteus* cell slurry, prepared by resuspending cold cell paste prepared as described in Example 1 in ice cold 0.5 percent sodium chloride solution, and containing about 100 g. dry weight of cells per liter of 0.5 percent sodium chloride solution, is adjusted to pH 8, and is treated with lysozyme at a concentration of $3.5 \times 10^6$ units per liter of cell slurry for a period of about 12 minutes at a temperature of 37°C. The lysed solution is cooled rapidly, mixed with one-half volume of cold saturated ammonium sulfate solution, and centrifuged; the supernatant is dialyzed for a period of about 15 hours against PNPase buffer. The retentate is treated with 0.66 volume of BBA ethanol, which has been precooled to below −20°C. The aqueous ethanol solution is allowed to stand at below about 5°C. for a period of about 15 hours, the precipitated material is recovered by centrifugation, is resuspended in 100 ml. of PNPase-buffer, and dialyzed against fresh PNPase buffer. The retentate is clarified by centrifugation to give a solution containing approximately 100 PNPase units per 100 gms. of M. luteus cells starting material (dry weight equivalent).

Various changes and modifications may be made in carrying out the present invention without departing from the spirit and scope thereof. Insofar as these changes and modifications are in the purview of the annexed claims, they are to be considered as part of this invention.

What is claimed is:

1. The process of preparing PNPase which comprises suspending cell paste separated from *M. luteus* fermented broth, in aqueous saline solution, and subjecting the resulting suspension to homogenization or lysis thereby rupturing said cells and forming a suspension of insoluble cell debris in aqueous PNPase solution; adding ammonium sulfate to a concentration of about 24 percent, and centrifuging thereby separating said cell debris as well as some protein material from the mixture thus forming a supernatant, aqueous solution of PNPase; adding to said supernatant an amount of lower alkanol merely sufficient to precipitate substantially all of the PNPase; and centrifuging the aqueous-alkanol mixture thereby recovering precipitated PNPase.

2. The process as defined in claim 1 in which the lower alkanol is methanol and the amount added is approximately 30–80 percent by volume of the aqueous PNPase solution.

3. The process as defined in claim 1 in which the lower alkanol is isopropanol and the amount added is approximately 30–40 percent by volume of the PNPase solution.

4. The process as defined in claim 1 in which the lower alkanol is ethanol and the amount added is approximately 35–45 percent by volume of the PNPase solution.

5. The process as defined in claim 1 in which the supernatant, following the ammonium sulfate addition and centrifugation, is dialyzed against PNPase buffer, thereby substantially removing inorganic salts, and the resulting retentate (PNPase solution) is diluted with approximately 40 percent by volume of ethanol.

* * * * *